W. ECKERT.
SPRING WHEEL.
APPLICATION FILED NOV. 7, 1907.
929,572.
Patented July 27, 1909.
2 SHEETS—SHEET 1.
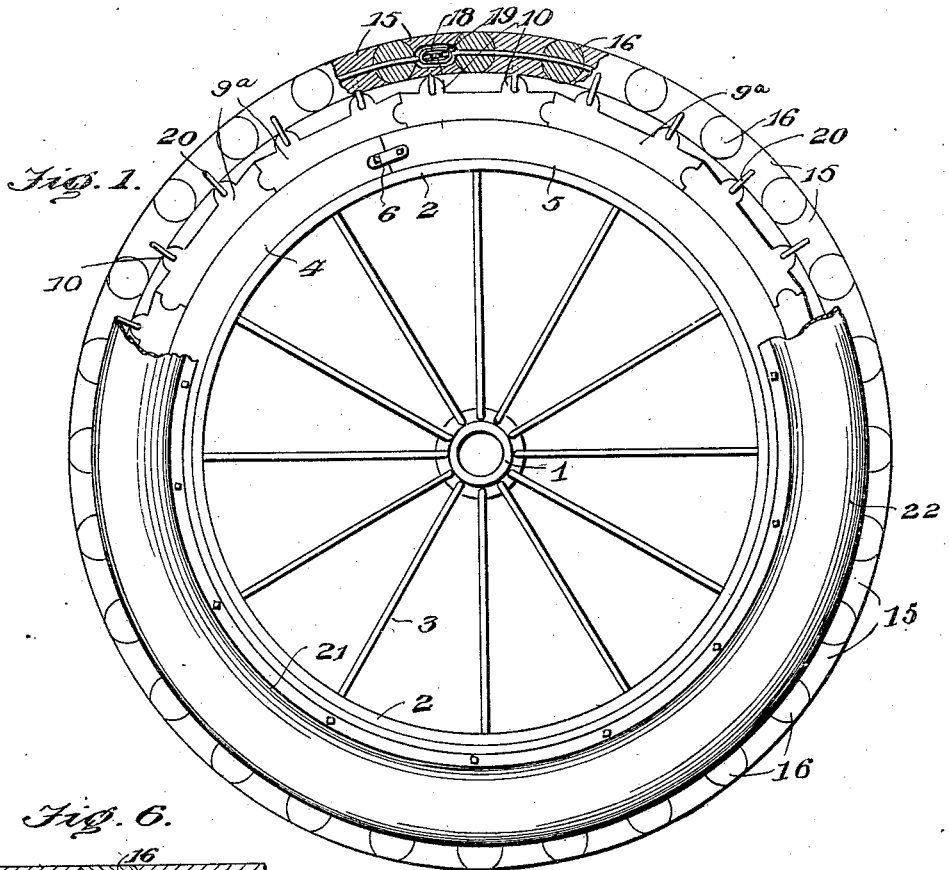
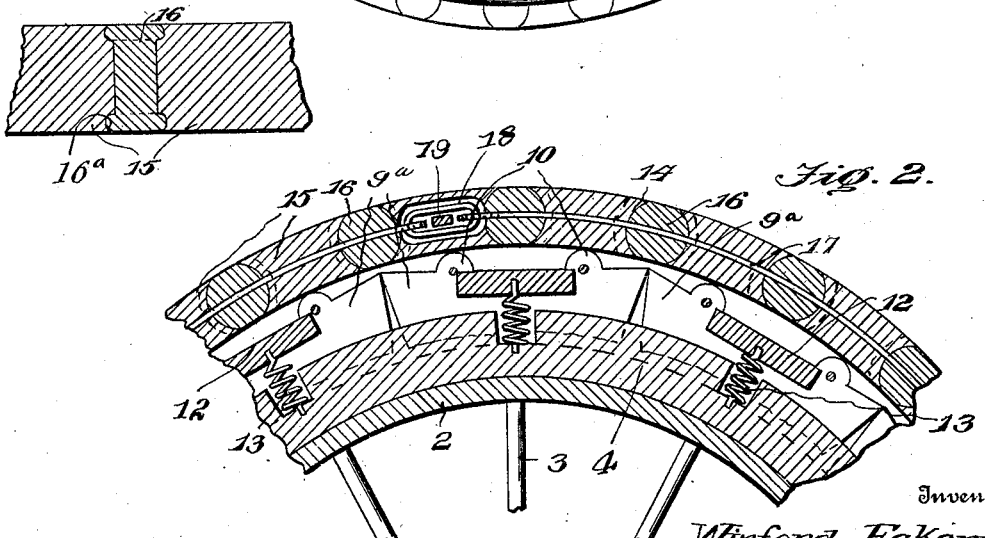
Inventor
Winford Eckert.
Witnesses
By
Attorneys W. ECKERT.
SPRING WHEEL.
APPLICATION FILED NOV. 7, 1907.
929,572.
Patented July 27, 1909.
2 SHEETS—SHEET 2.
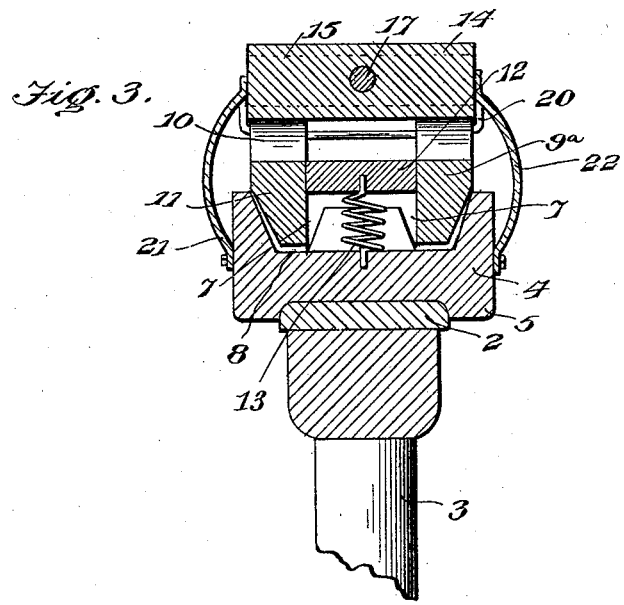
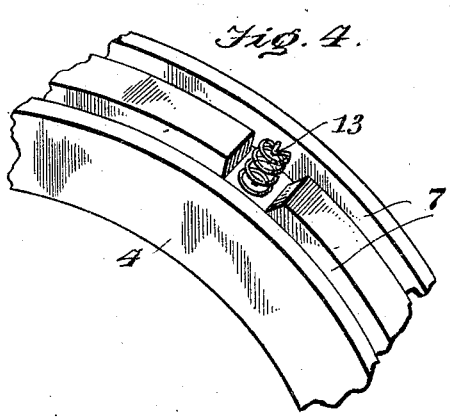
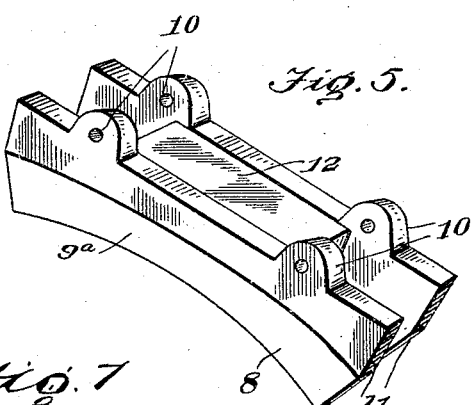
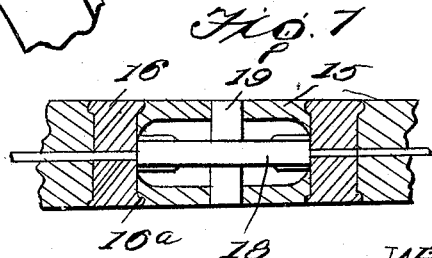
Inventor
Winford Eckert.
Witnesses
By
, Attorneys

UNITED STATES PATENT OFFICE.

WINFORD ECKERT, OF NORTHWOOD, IOWA.

SPRING-WHEEL.

No. 929,572.  Specification of Letters Patent.  Patented July 27, 1909.

Application filed November 7, 1907. Serial No. 401,184.

*To all whom it may concern:*

Be it known that I, WINFORD ECKERT, citizen of the United States, residing at Northwood, in the county of Worth and State of Iowa, have invented certain new and useful Improvements in Spring-Wheels, of which the following is a specification.

The present invention has for its object to provide a cushion tire for vehicle wheels and the like, the said tire being constructed entirely of metal and yet possessing all the advantages and resiliency of a rubber tire.

A further object of the invention is to design an inexpensive tire of this character which can be readily applied to any conventional type of vehicle wheel and will operate in an efficient manner to absorb all shocks and jars and prevent the same from being transmitted to the vehicle body.
For a full description of the invention and the merits thereof and also to acquire a knowledge of the details of construction and the means for effecting the result, reference is to be had to the following description and accompanying drawings, in which:

Figure 1 is a side elevation of a wheel embodying the invention, portions being broken away and shown in section. Fig. 2 is an enlarged vertical sectional view through a portion of the rim of the wheel. Fig. 3 is an enlarged transverse sectional view through the rim of the wheel. Fig. 4 is a detail view of a portion of the inner rim. Fig. 5 is a similar view of one of the sections of the outer rim. Fig. 6 is a longitudinal sectional view through a portion of the flexible band extending around the outer rim of the tire. Fig. 7 is a similar view showing the turnbuckle for producing tension in the wire extending through the band, and also showing the key for locking the turnbuckle against working loose.

Corresponding and like parts are referred to in the following description and indicated in all the views of the drawings by the same reference characters.

The cushion tire embodied in the present invention may be applied to any approved type of wheel such as that shown in the drawing, the said wheel comprising a hub 1 and a felly 2, the said hub and felly being connected by the spokes 3. Surrounding the felly 2 is the inner rim 4 of the cushion tire, the said rim being provided upon each side with an annular flange 5 for engagement with the felly 2.

In the preferred construction the rim 4 of the tire is formed of a strip of material having the ends thereof connected by a joint 6, such construction admitting of the tire being applied to wheels of various sizes by suitably adjusting the length of the strip. A pair of annular grooves 7 are formed in the periphery of the rim 4 and receive corresponding ribs 8 projecting inwardly from the outer rim. This outer rim comprises a plurality of sections 9ª having their adjacent ends loosely connected in any suitable manner and provided upon their outer faces with the lugs 10. In the present instance each of these sections 9ª is formed of a pair of spaced longitudinal strips 11 connected at an intermediate point by the cross piece 12, the inner edges of the strips 11 being reduced in width to form the ribs 8 which fit loosely within the grooves 7 while the outer edges are formed with corresponding projections constituting the lugs 10. A spring 13 is interposed between each of the sections 9ª of the outer rim and the inner rim 4, the said springs being received within recesses in the inner rim and having one of their ends connected to the said inner rim while their opposite ends are connected to the cross pieces 12 of the sections 9ª. Extending around the sectional outer rim is a chain or flexible band 14 comprising the loosely connected blocks 15 each of which is designed to bear against one of the lugs 10 so as to have a rocking movement thereon. Interposed between the various blocks 15 are the bearing members 16 which are shown as being of substantially cylindrical formation and received within corresponding recesses formed in the adjacent ends of the blocks. A wire or similar flexible member 17 extends loosely through the various blocks 15 and bearing members 16, the two ends of the wire being connected by a turn buckle 18 disposed within one of the blocks 15 which has a hollow formation. By means of this turn buckle the tension in the wire 17 can be adjusted to the required degree and a key 19 is provided for locking the turn buckle against working loose after proper adjustment has been made. The various blocks 15 are loosely connected to the outer rim by means of the link members 20 which hold the blocks against displacement and at the same time permit them to have a rocking movement upon the lugs to accommodate themselves to the inequalities of road surface and thereby reduce the magnitude of the shocks and jars to be absorbed by the cushioning members between the outer and inner concentric rims of the tire.

For the purpose of preventing mud and dust or other foreign matter from lodging between the two rims of the tire or between the outer sectional rim and the chain 14 in such a manner as to interfere with the proper operation of the members guards 21 are applied to opposite sides of the wheel. Both of the guards are formed of resilient material and have their inner edges secured to the inner rim 4 while their outer edges bear yieldingly against the sides of the chain 14, intermediate portions of the said guard members being pressed outwardly as indicated at 22 to provide ample clearance space for the sectional outer rim.

In the operation of the wheel it will be readily apparent that owing to the fact that the various blocks 15 of the chain or flexible band 14 rock freely upon the lugs 10 the tread of the wheel will be enabled to accommodate itself to slight inequalities of road surface while all shocks and jars are effectively absorbed or broken by the springs 13 interposed between the inner rim 4 and the sectional outer rim.

It will be observed that the blocks 15 of the flexible band 14 do not normally come into actual contact with each other but are slightly spaced so as to permit a proper rocking movement of the same upon the lugs 10 when the tread of the wheel meets with an inequality upon the road surface. In this connection it may be noted that while the bearing members 16 are of approximately cylindrical formation the inner and outer portions of the same are slightly flattened so as to be flush with the blocks 15. As shown on the drawing the bearing members 16 are provided at their two extremities with lateral flanges 16ª received within corresponding recesses in the blocks and operating to hold the bearing members against longitudinal displacement.

Having thus described the invention, what is claimed as new is:

1. In a spring wheel, the combination of a rim provided upon its periphery with lugs, a plurality of loosely connected blocks surrounding the rim, the various blocks bearing against the lugs so as to rock thereon, and link members loosely connecting the blocks to the rim.

2. In a spring wheel, the combination of an inner rim, an outer rim provided upon its periphery with lugs, cushioning means interposed between the inner rim and outer rim, and a plurality of loosely connected blocks surrounding the outer rim and bearing against the lugs so as to rock thereon.

3. In a spring wheel, the combination of an inner rim, an outer rim formed of a plurality of loosely connected sections, each of the sections being provided with outwardly projecting lugs cushioning means interposed between the inner rim and the outer rim, and a plurality of loosely connected blocks surrounding the outer rim and bearing against the lugs so as to rock thereon.

4. In a spring wheel, the combination of an inner rim, an outer rim formed of a plurality of loosely connected sections, cushioning means interposed between the inner rim and the outer rim, the sections of the outer rim being provided with lugs, a plurality of loosely connected blocks surrounding the outer rim and bearing against the lugs so as to rock thereon, and link members loosely connecting the blocks to the outer rim.

5. In a spring wheel, the combination of an inner rim, provided with an annular broove, an outer sectional rim provided with an annular rib loosely received within the groove, the said outer rim being provided with lugs, cushioning means interposed between the inner rim and the outer rim, and a plurality of loosely connected blocks surrounding the outer rim and bearing against the lugs so as to rock thereon.

6. In a spring wheel, the combination of an inner rim, an outer rim provided with lugs, cushioning means between the outer rim and inner rim, a plurality of loosely connected blocks surrounding the outer rim and adapted to rock upon the lugs, and guard members applied to opposite sides of the inner rim and engaging the blocks.

In testimony whereof I affix my signature in presence of two witnesses.

WINFORD ECKERT. [L. S.]

Witnesses:
  RALPH MARSHALL,
  DON MARSHALL.